US010906129B2

(12) United States Patent
Scherbakov et al.

(10) Patent No.: US 10,906,129 B2
(45) Date of Patent: *Feb. 2, 2021

(54) MULTIBEAM LASER SYSTEM AND METHODS FOR WELDING

(71) Applicant: IPG PHOTONICS CORPORATION, Oxford, MA (US)

(72) Inventors: Eugene Scherbakov, Burbach (DE); Valentin Fomin, Burbach (DE); Andrey Abramov, Burbach (DE); Dmitri Yagodkin, Burbach (DE); Holger Mamerow, Burbach (DE)

(73) Assignee: IPG PHOTONICS CORPORATION, Oxford, MA (US)

( * ) Notice: Subject to any disclaimer, the term of this patent is extended or adjusted under 35 U.S.C. 154(b) by 193 days.

This patent is subject to a terminal disclaimer.

(21) Appl. No.: 15/573,655

(22) PCT Filed: May 26, 2016

(86) PCT No.: PCT/US2016/034354
§ 371 (c)(1),
(2) Date: Nov. 13, 2017

(87) PCT Pub. No.: WO2016/200621
PCT Pub. Date: Dec. 15, 2016

(65) Prior Publication Data
US 2018/0147660 A1 May 31, 2018

Related U.S. Application Data

(60) Provisional application No. 62/166,658, filed on May 26, 2015.

(51) Int. Cl.
B23K 26/067 (2006.01)
B23K 26/06 (2014.01)
(Continued)

(52) U.S. Cl.
CPC ........ *B23K 26/067* (2013.01); *B23K 26/0608* (2013.01); *B23K 26/21* (2015.10);
(Continued)

(58) Field of Classification Search
CPC .. B23K 26/067; B23K 26/21; B23K 26/0608; B23K 26/22; B23K 26/24; B23K 26/32; B23K 26/322; G02B 6/00
(Continued)

(56) References Cited

U.S. PATENT DOCUMENTS

2007/0223552 A1* 9/2007 Muendel ............ G02B 6/12004
372/50.12
2010/0061410 A1* 3/2010 Platonov .................. G02B 6/32
372/21

FOREIGN PATENT DOCUMENTS

JP 10314974 A * 12/1998
JP 2004105970 A * 4/2004

OTHER PUBLICATIONS

English Machine translation of JP 2004-105970 printed Dec. 3, 2019 (Year: 2019).*

* cited by examiner

Primary Examiner — Christine J Skubinna
(74) Attorney, Agent, or Firm — Yuri B. Kateshov, Esq.; Timothy J. King, Esq.

(57) ABSTRACT

The present invention provides a multi-fiber laser output system that delivers at least three fiber outputs arranged in a circumferential pattern or otherwise at least four distinct laser outputs from a single processing cable. The present invention allows for controlling the at least three laser modules and delivering their respective outputs in a predetermined sequence in a single processing cable, thereby providing multiple processing steps on a work piece that heretofore required separate optics for each beam. The at (Continued)

least three laser outputs are optimized for use in creating spot welds, seam welds or virtual wobble welds when used for seam welding.

20 Claims, 12 Drawing Sheets

(51) Int. Cl.
*G02B 6/04* (2006.01)
*B23K 26/24* (2014.01)
*B23K 26/22* (2006.01)
*B23K 26/32* (2014.01)
*B23K 26/322* (2014.01)
*B23K 26/21* (2014.01)
*B23K 101/18* (2006.01)
*B23K 101/00* (2006.01)
*B23K 101/34* (2006.01)
*B23K 103/04* (2006.01)
*B23K 103/10* (2006.01)

(52) U.S. Cl.
CPC .............. *B23K 26/22* (2013.01); *B23K 26/24* (2013.01); *B23K 26/32* (2013.01); *B23K 26/322* (2013.01); *G02B 6/04* (2013.01); *B23K 2101/006* (2018.08); *B23K 2101/18* (2018.08); *B23K 2101/34* (2018.08); *B23K 2103/04* (2018.08); *B23K 2103/10* (2018.08)

(58) Field of Classification Search
USPC .................................................... 219/121.61
See application file for complete search history.

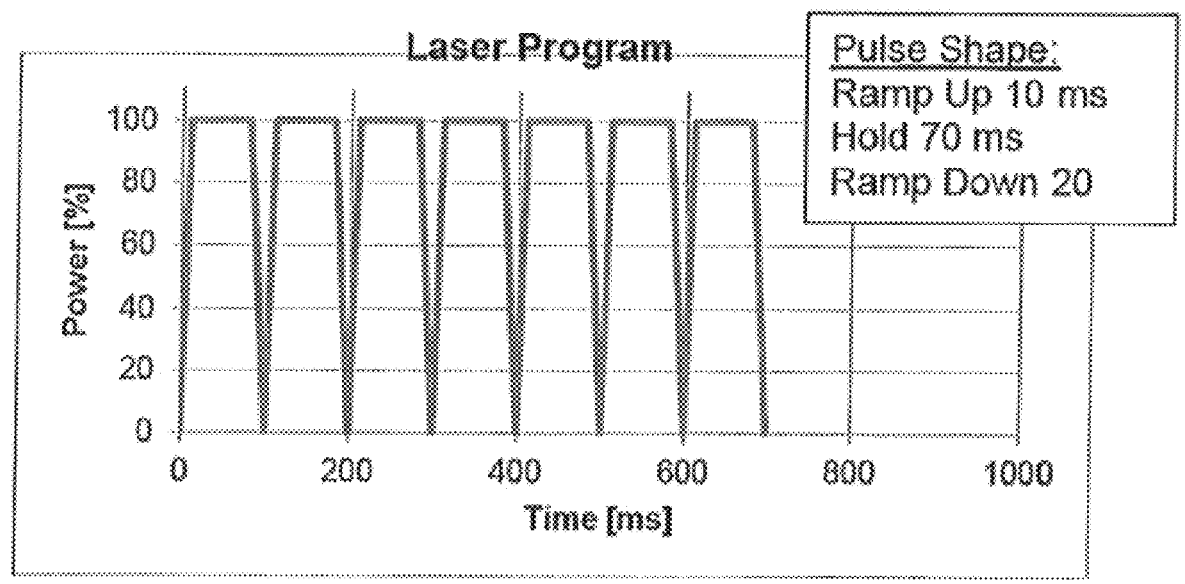
Figure 7c
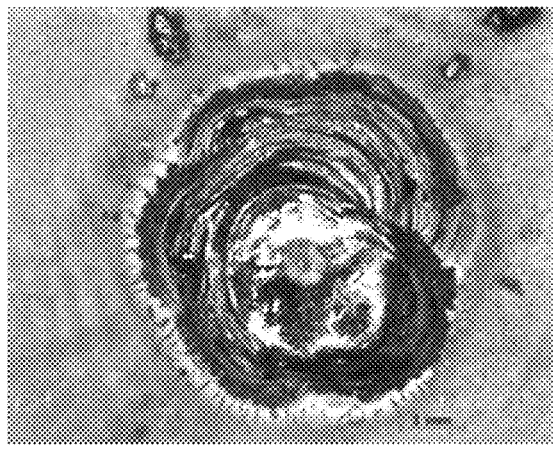 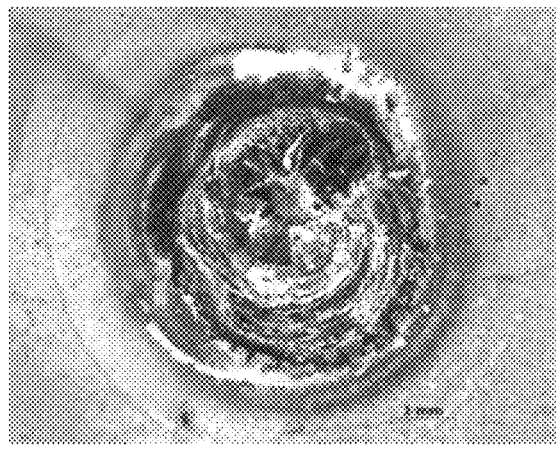
Figure 7d        Figure 7e

MULTIBEAM LASER SYSTEM AND METHODS FOR WELDING

FIELD OF THE DISCLOSURE

The disclosure relates to coupling the laser light from at least four fiber outputs into a single optical component and controlling the output from the respective laser sources coupled into said fiber outputs such that four or more distinct fiber laser outputs may be delivered downstream. The disclosure also relates to coupling the laser light from at least three fiber outputs arranged in a circumferential pattern into a single optical component and controlling the output from the respective laser sources coupled into said fiber outputs such that three or more distinct laser outputs may be delivered downstream. In addition, the disclosure relates to use of the fiber laser outputs to weld a plurality of work pieces.

BACKGROUND OF THE DISCLOSURE

Use of multiple beam devices for materials processing is quite common. For example, single optical fibers delivering a single laser output can be in optical communication with diffractive optical elements that can provide an incoherent output targeted to multiple spots, as found at http://www-.tailorweld.eu/overview/concept. Unfortunately, this configuration only works if the application requires each of the locations on the work piece be subjected to a laser beam, including wavelength, power and pulse width, identical to the other. What is needed is a laser system that can deliver multiple beams to a work piece wherein the multiple beams are incoherent and distinct with respect to their properties.

The fiber laser has developed to the point that there are multiple wavelengths available in a wide swath of powers, pulse widths and rep rates. Indeed, numerous applications have developed that take advantage of the variety of laser light available. For example, in WO/2013/019204, the inventors considered a multi-laser system to remove the coating of stainless steel and then cut the steel, all with a combined beam. Ultimately, a single laser system was found that rendered this multi-laser system un-necessary. However, a stumbling block in connection with its commercialization was the need for sophisticated optics in the laser head to deliver the combined process beam. In addition, since the lasers were separate systems, use of the CPU to control the systems was found not to be a dynamic enough control environment to alter the processing parameters of the lasers to meet the application requirements.

Nevertheless, the concept of combining multiple laser outputs is well developed, including combining distinct laser outputs into a single fiber optic cable. U.S. Pat. No. 5,048,911 provides the use of mirrors to create parallel outputs that are then subsequently focused into a single fiber optic cable that would deliver the parallel outputs. However, such systems require multiple optics that introduce complexity, further increasing their cost not to mention opportunities for the degradation of the output.

U.S. Pat. No. 6,229,940 requires the uses of multiple couplers and lenses to produce the incoherent laser light outputs that are combined in a cascade approach. In addition, its limitation to only single mode light does not reflect the wide variety of applications where multi-mode light is acceptable, if not desirable.

While the prior art provides aligned fiber optical arrangements, they are inconsistent with the needs of the industrial environment where cost sensitivities and the need for robustness make such prior art solutions untenable. Indeed, US20040081396 required a registration guide to align the fibers and downstream optics to collimate the beams.

In addition, while fiber to optic bonding has been taught, they are combined with a lens to compensate for collimating effects, where the optic is a lens or where the array of fibers and their respective outputs are combined, such as in U.S. Pat. No. 7,130,113.

The applicant has previously engaged in development of multibeam laser systems as found in U.S. Ser. No. 62/036,740 filed 13 Aug. 2014 and German Patent Application No. DE 102015207279.7 filed 22 Apr. 2015, the contents of each of which are incorporated by reference in their entirety. Unfortunately, the three beam configuration disclosed in these prior applications is not optimized to solve the demanding requirements for spot welding. Moreover, that configuration fails to solve difficult seam welding challenges that require a wobble.

The present invention addresses the problem posed by the need for expensive scanners for laser spot welding. Conventional laser spot welders use a single beam that must be rotated about an initial contact with a work piece to create a spiral or screw weld in an extremely small space. Such laser welds require expensive scanners to insure the integrity of such a spiral or screw weld.

The present configurations solves the need for precise spot and wobble welding requirements with multi-beam laser system configurations that provide a low-cost and robust optic that can provide incoherent laser beams in a predetermined configuration in which the parameters of the output can be controlled. Moreover for the seam weld-wobble configuration, a non-mechanical solution is provided that may provide a more reliable result than the mechanical wobble systems presently available.

Lastly, the present invention precludes the need for a scanner for laser spot welding and indeed as the entire width of the spot weld can be from 2.5 mm to 5 mm in diameter; it can allow for manufacturers to downsize if not eliminate any tabs currently necessary for larger single laser spot welders or resistance spot welders.

SUMMARY OF THE DISCLOSURE

The present invention provides a laser system for providing at least three independently controlled multiple incoherent laser outputs if delivered in a circumferential arrangement or otherwise at least four independently controlled multiple incoherent laser beam outputs that are delivered in respective optical fibers. In a preferred embodiment of the invention, the laser beam outputs are generate d from a fiber laser. In yet another preferred embodiment, the respective fibers for the multiple beam outputs are fused to a bulk optic adjacent to the terminal end of a processing fiber.

The present invention provides a preferred embodiment of the multiple laser outputs for a spot weld in which 6, and more preferably 7, laser outputs combine to create a spot weld. In a more preferred embodiment, the laser outputs are operated sequentially, rather than simultaneously, yet all within a time frame preferably less than a second per complete weld.

The configuration of 6 fibers in a hexagon can also provide for a virtual wobble function for a seam weld if activated in sequence while a workpiece or the laser move with respect to each other along such a seam.

In a preferred embodiment, the laser system of the present invention is provided within a class one laser system, such that it can produce spot or wobble seam welds free from the constraints of a laser work cell.

The laser systems of the present invention are particularly adapted for welding. Accordingly, the present invention provides methods of welding that utilize the multi laser fiber output configurations disclosed herein.

More specifically, the present invention provides a method of welding a plurality of work pieces from a multiple fiber laser beam output from a single processing cable, the method comprising providing a laser system including at least three fiber laser modules if the fiber outputs are arranged circumferentially or otherwise at least four fiber laser modules, each of which being configured to operate independently from the others and provide distinct fiber laser outputs; initiating a sequence of distinct fiber laser outputs from each of the at least three fiber laser modules if the fiber outputs are arranged circumferentially or otherwise at least four fiber lasers, all of which configured to optically couple with the work piece; and each distinct fiber laser output configured to deliver an amount of energy sufficient to contribute to a pattern of material interaction, the combination of each laser output contributing to a pre-determined weld of sufficient strength.

In a preferred embodiment the sequence of activating each distinct fiber laser outputs is configured to provide a spot weld. In another embodiment the sequence of activating each distinct fiber laser outputs is configured to provide a seam weld to the plurality of work pieces. More preferably, the seam weld can be characterized as a wobble weld.

BRIEF DESCRIPTION OF THE DRAWINGS

The above and other aspects, features and advantages of the disclosure will become more readily apparent with the aid of the following drawings, in which:

FIG. 5a provides the intensity distribution of a focused image of the beams of the embodiment of the present invention found in FIG. 3a.

FIG. 5b provides the intensity distribution of an unfocused image of the beams of the embodiment of the present invention found in FIG. 3a.

FIG. 6b provides the sequence of the outputs of the preferred embodiment in terms of which fiber as well as the duration of the outputs with respect to each other and the complete cycle for the spot weld in 6a.

FIG. 7c provides the laser program for the sequence program of FIG. 7b.

FIG. 7d is a top view of the spot weld created in the process memorialized in FIGS. 7a-7c.

FIG. 7e is a bottom view of the spot weld created in the process memorialized in FIGS. 7a-7c.

FIG. 10b is a picture of a weld created by a configuration set forth in FIG. 10a.

SPECIFIC DESCRIPTION

Figure 1:
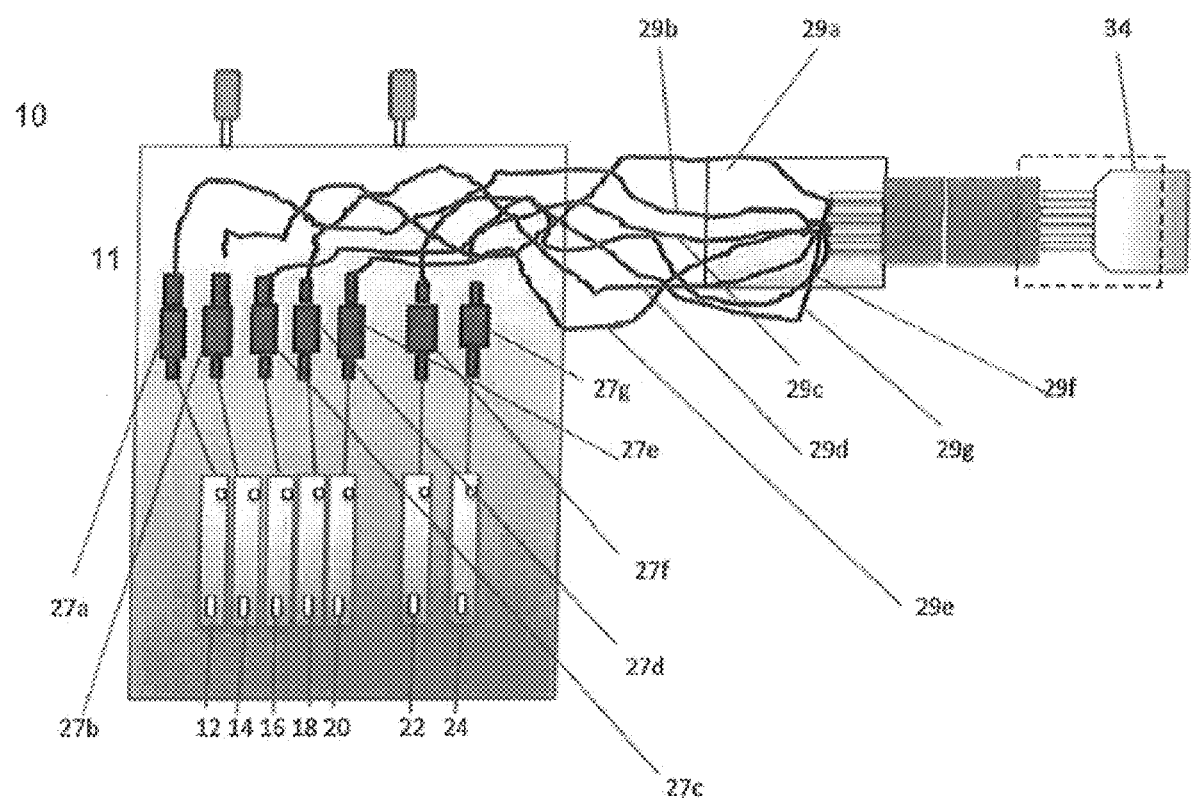
FIG. 1 is a partial sectional view of a multibeam laser system of the present invention.

Reference will now be made in detail to embodiments of the invention. Wherever possible, same or similar reference numerals are used in the drawings and the description to refer to the same or like parts or steps. The drawings are in simplified form and are not to precise scale. For purposes of convenience and clarity only, directional (up/down, etc.) or motional (forward/back, etc.) terms may be used with respect to the drawings. The term "couple" and similar terms do not necessarily denote direct and immediate connections, but also include connections through intermediate elements or devices.

FIG. 1 sets forth one embodiment of the present invention, whereby a laser system 10 delivers three different outputs through delivery optical fibers 29a-29g that are coupled to a bulk optic 34. Preferably, the delivery optical fibers 29a-29g are coupled to the bulk optic 34 by being fused to the bulk optic 34. Preferably the delivery optical fibers and the bulk optic 34 are made from identical materials, such as quartz, such that they have identical refractive indices. More preferably, the refractive index of the bulk optic 34 and each of the delivery optical fibers is 1.45.

The housing 11 of laser system 10 contains laser modules 12, 14, 16, 18, 20, 22 and 24. In the present invention, laser modules 12, 14, 16, 18 and 20 provide identical output in delivery optical fibers 29a-29g. Each module was a 1200 W ytterbium fiber laser module.

For ease of construction, combiners 27a-27g were used. These combiners are more fully described in International Patent Application No. PCT/US2014/018688 owned by Applicant and herein incorporated by reference in its entirety. The combiner 21 has an output fiber 26 in optical communication with a fiber coupler 28.

In this embodiment the laser modules provide an output of 1070 nm as their active fibers are Yb, but any variety of wavelengths is contemplated, such that Er, Th, Ho, doped fibers, or some combination thereof, are contemplated not to mention fiber lasers in which the output is frequency shifted by virtue of non linear optical crystals, Raman fibers and the like, assuming the spot or wobble weld configuration requires the wavelengths produced thereby.

While the light produced in the present invention is multi-mode as that is what the application demanded, single mode light could also be provided as the particular application requires. One of the modules, such as the first fiber used in the sequence that is preferably in the center of the configuration, may preferably be a single mode while external lasers that form the outline of the hexagon are multi-mode.

While the laser modules of the present invention are all CW modules that are operated in sequence, quasi-continuous wave lasers may be substituted, depending upon the demands of the welding application. Indeed, another configuration contemplated includes using a CW module for the center spot while utilizing QCW modules for the laser outputs on the periphery.

Figure 2:
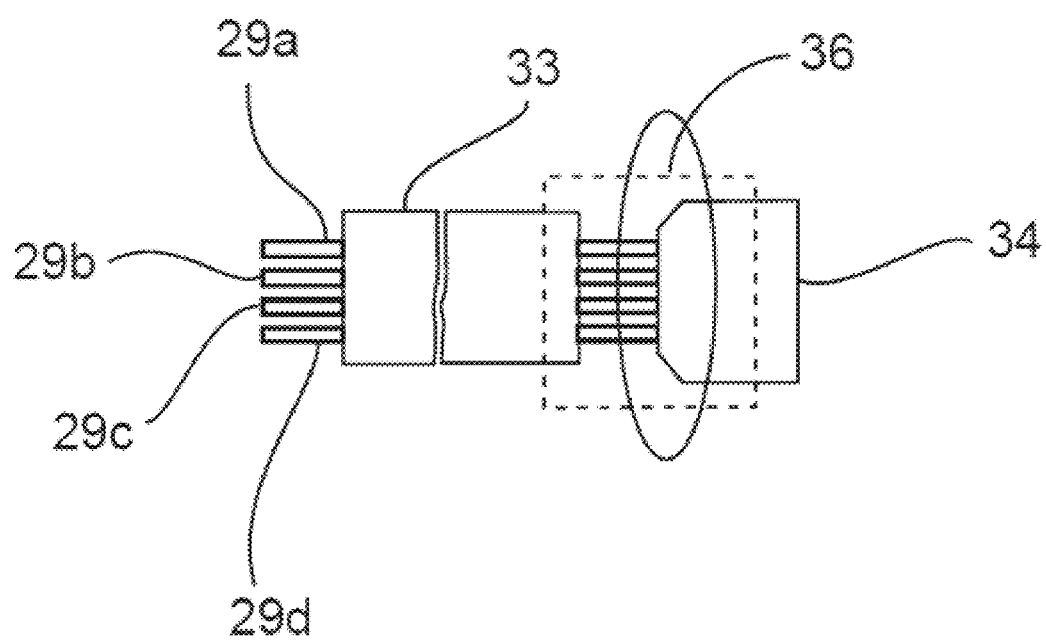
FIG. 2 is a close up and a partial sectional view of the bulk optic and delivery fibers of the system of FIG. 1.

FIG. 2 provides an exploded, sectional view of the connection of the delivery optical fibers 29a-29d (29e-29g are behind) to the bulk optic 34. In this embodiment, the bulk optic 34 and delivery optical fibers 29a-29g are surrounded by an outer covering 33 to form a processing cable. The respective fibers are coupled to the bulk optic 34. More preferably, the respective fibers are fused to the bulk optic 34 at a surface 36.

Figure 3A:
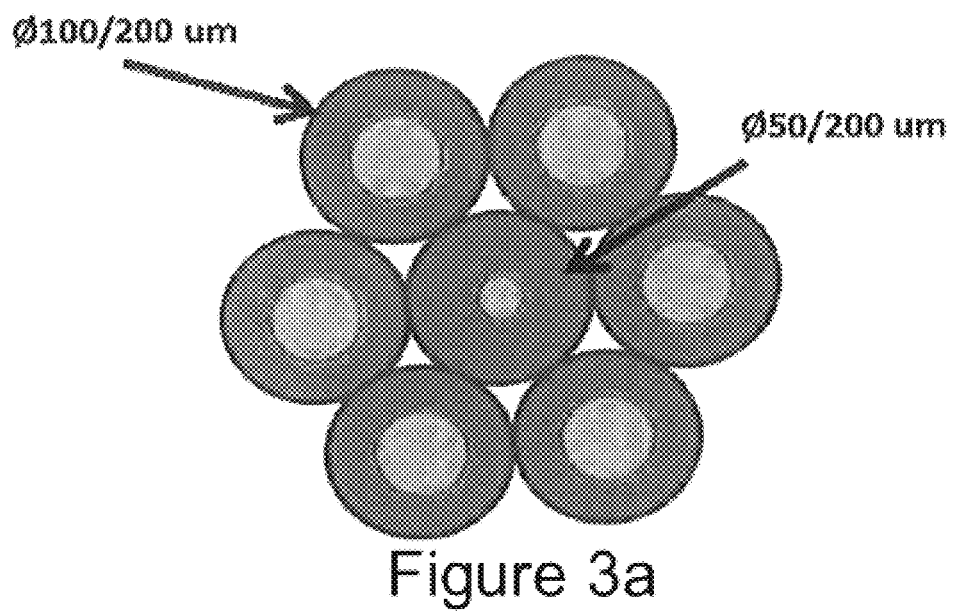
FIG. 3a is an exemplary cross-sectional view of individual delivery fibers from the laser modules of the spot weld embodiment.
Figure 3B:
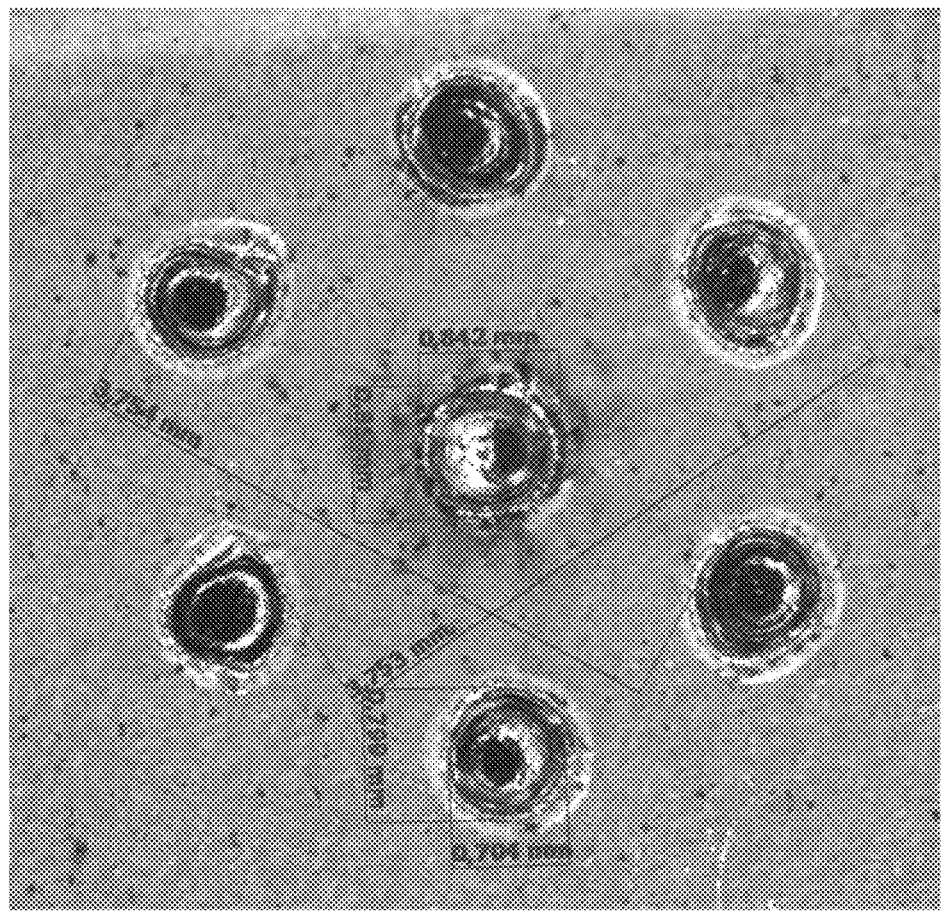
FIG. 3b provides the relative and absolute positions of the output of the delivery fibers of FIG. 3a when contacting a work piece.

FIG. 3a provides a cross section of the delivery optical fibers 29a-29g proximate to their fusion location 36 on the bulk optic 34. As one of ordinary skill in the art can appreciate, the seven fibers are spaced apart with respect to each other in a pre-determined arrangement. In the embodiment of the present invention, all seven fibers have an outer diameter of 200 µm. The middle fiber has a smaller core diameter of 50 µm while the delivery fibers on the periphery have equivalent core diameters of 100 µm. The present invention is not limited to this embodiment, but this embodiment was found to produce the best spot welds. This particular embodiment of the present invention was found to produce quality spot welds of aluminum and various aluminum alloys and hot formed steel such as Usibor® 1500 and 22MnB5 (Usibor® is a trademark of ArcelorMittal).

As delivery optical fibers are now manufactured in numerous shapes, it is contemplated that different shaped fibers, as well as diameters, may be used, but the present configuration appears to produce a satisfactory weld. Moreover, the present invention contemplates an additional ring of delivery fibers, and respective laser modules that would be outside the circumference of the six. Preferably, the additional ring of delivery fibers would comprise 19 delivery fibers in optical communication with their respective laser sources.

FIG. 3a provides a photograph of a work piece treated by a focused output from the delivery fiber configuration of FIG. 3a. Each individual spot is less than a mm in diameter with the total diameter of the weld being less than 5 mm.

Figure 4:
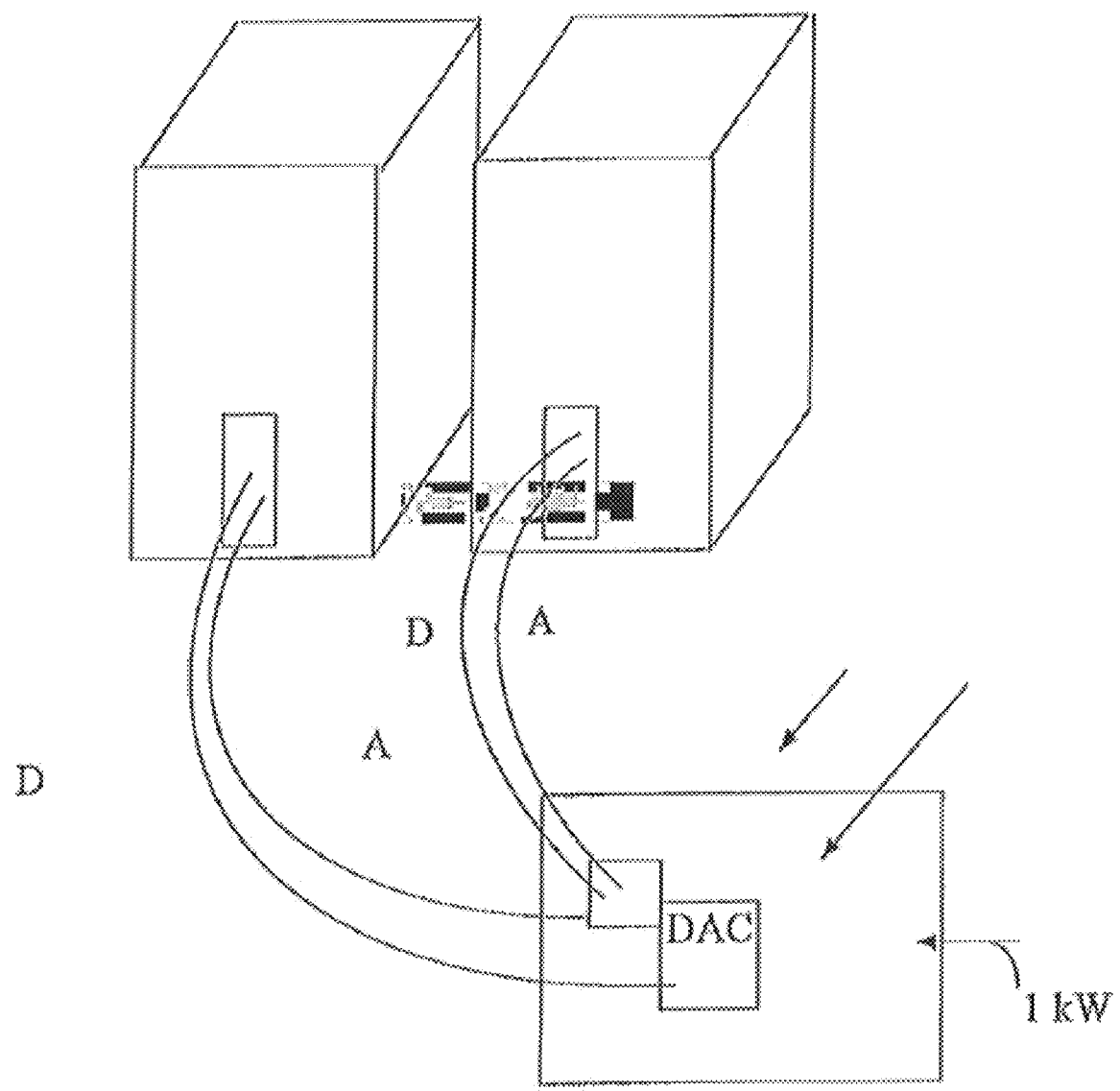
FIG. 4 provides an analog to digital control schematic for a system of the present invention.

The laser modules of the present invention may preferably be operable independent from each other, but nevertheless may preferably be subject to a unifying control schematic to allow for dynamic adjustments to the outputs therefrom. FIG. 4 provides a standard control format where the independently operated laser modules are further controlled through the use of a digital to analog controller. This will allow for the control of the independently operate laser modules in parallel. Those of ordinary skill in the art would recognize that a variety of control schemes could operate this preferred embodiment of the present invention. For example, in the present invention the LaserNet software provided as a standard software control package with lasers shipped from IPG Laser GmbH was used to program the power and width of the output from the modules. A sequence editor was utilized to time the activation of each of the modules. As further described below, FIGS. 6a-6b and 7a-7b set forth the creation of the spot welds of the present invention within approximately 700 ms. The range in which the present invention can provide a complete spot weld, including the activation of all 7 fiber outputs in the preferred embodiment, is between 300 ms and 1 second. While slower welding times are contemplated, they would not be competitive with existing technologies.

Figures 5A, 5B:
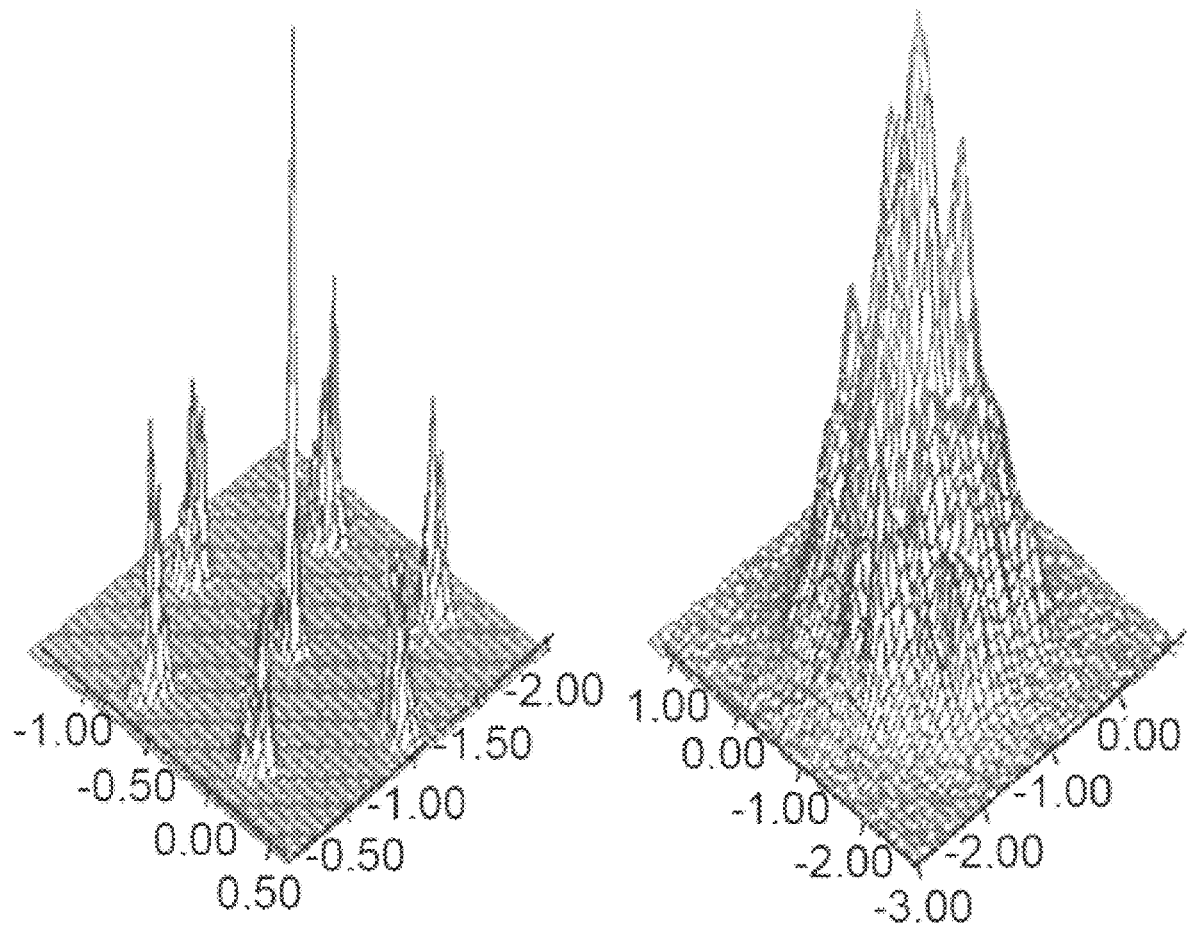
Figure 6A:
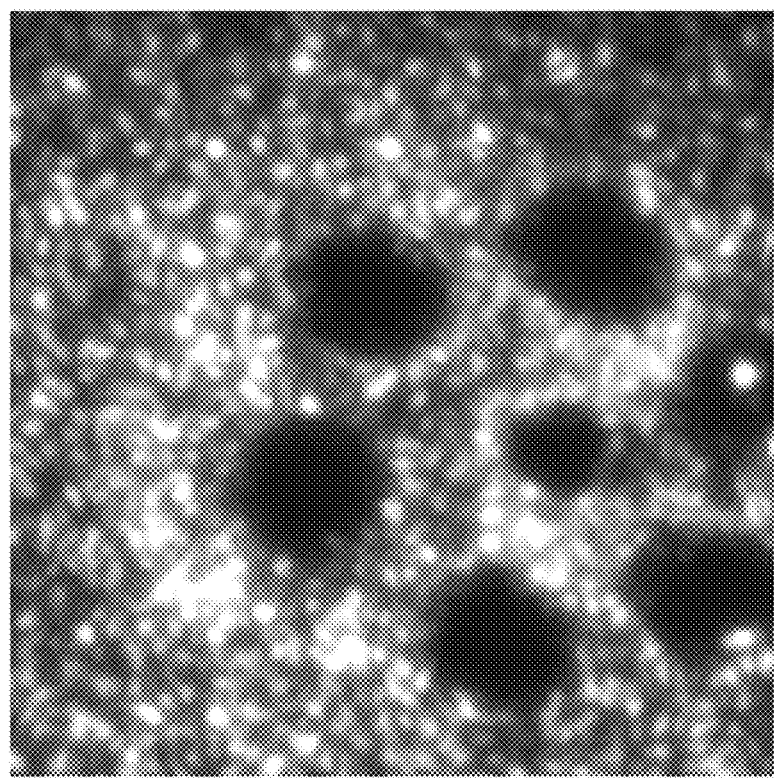
FIG. 6a is a photograph of a near completed spot weld when the beams remain focused.
Figure 6B:
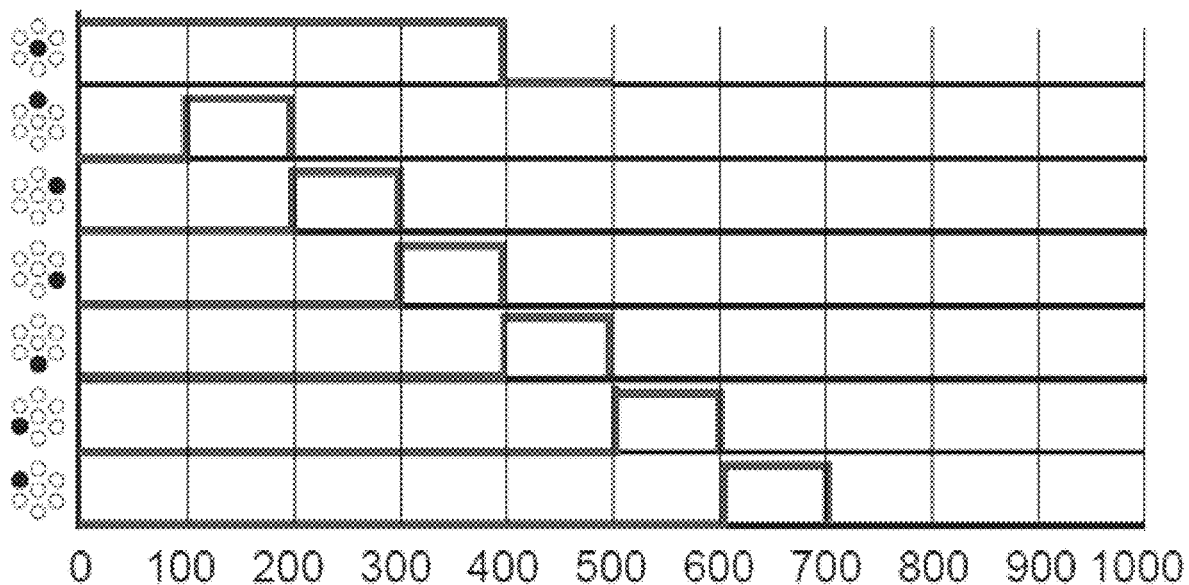
Figure 6C:
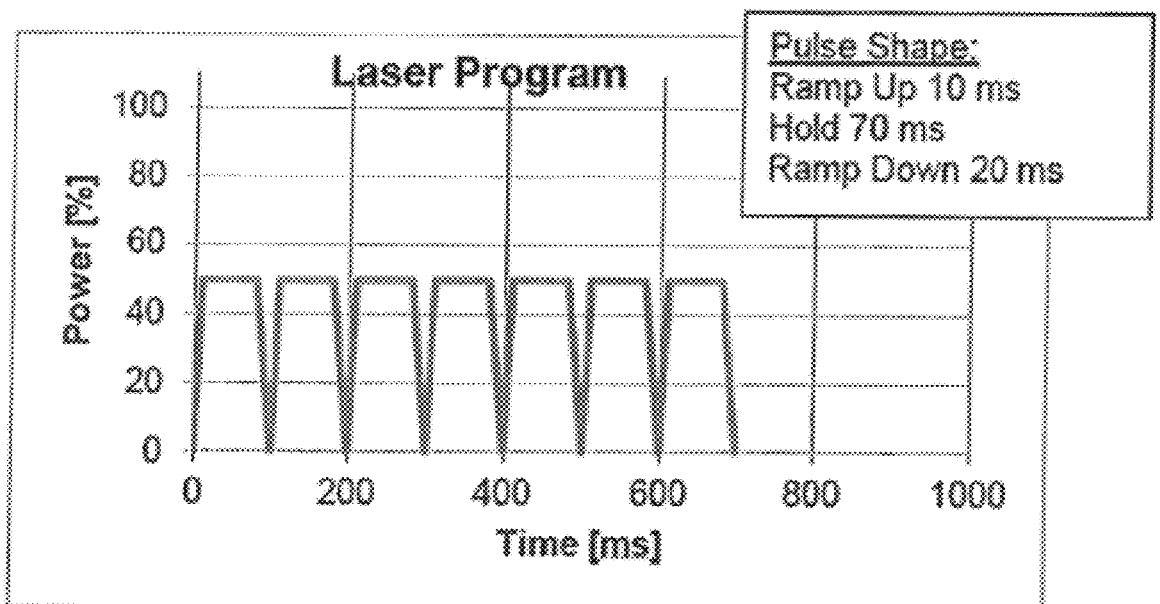
FIG. 6c provides the laser program for the sequence program of FIG. 6b.
Figure 6D:
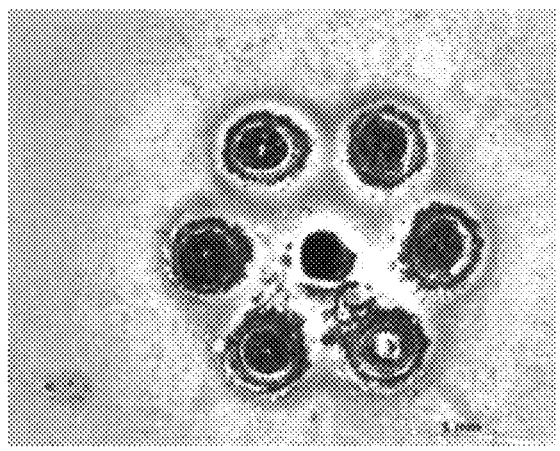
FIG. 6d is a top view of the spot weld created in the process memorialized in FIGS. 6a-6c.
Figure 6E:
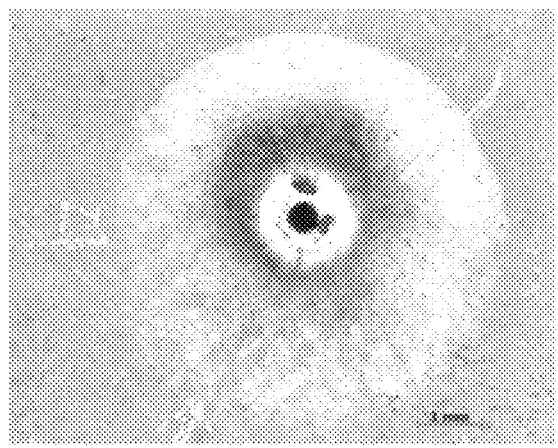
FIG. 6e is a bottom view of the spot weld created in the process memorialized in FIGS. 6a-6c.
Figure 7A:
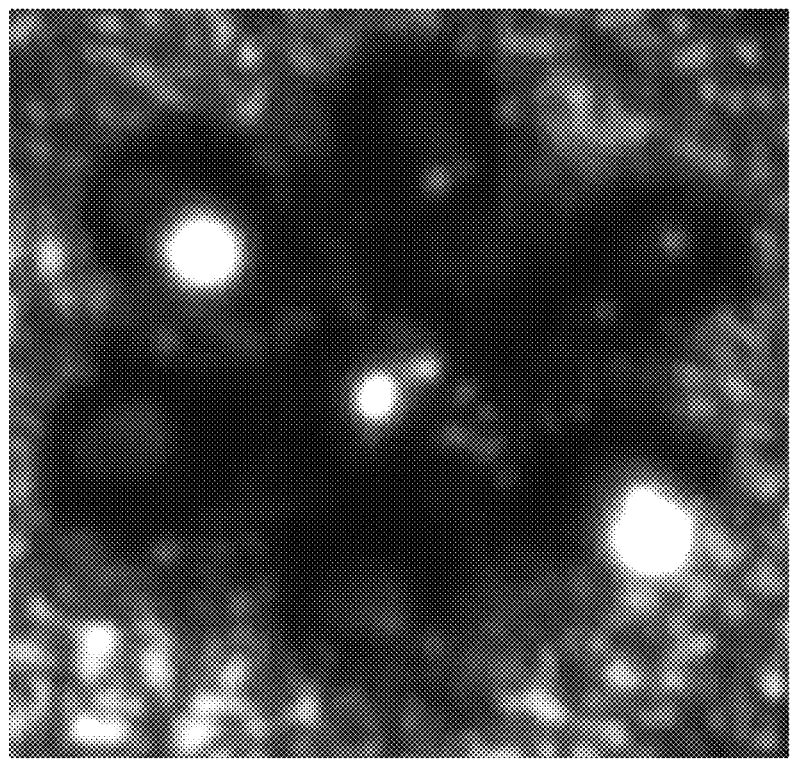
FIG. 7a is a photograph of a near completed spot weld when the beams are un-focused.
Figure 7B:
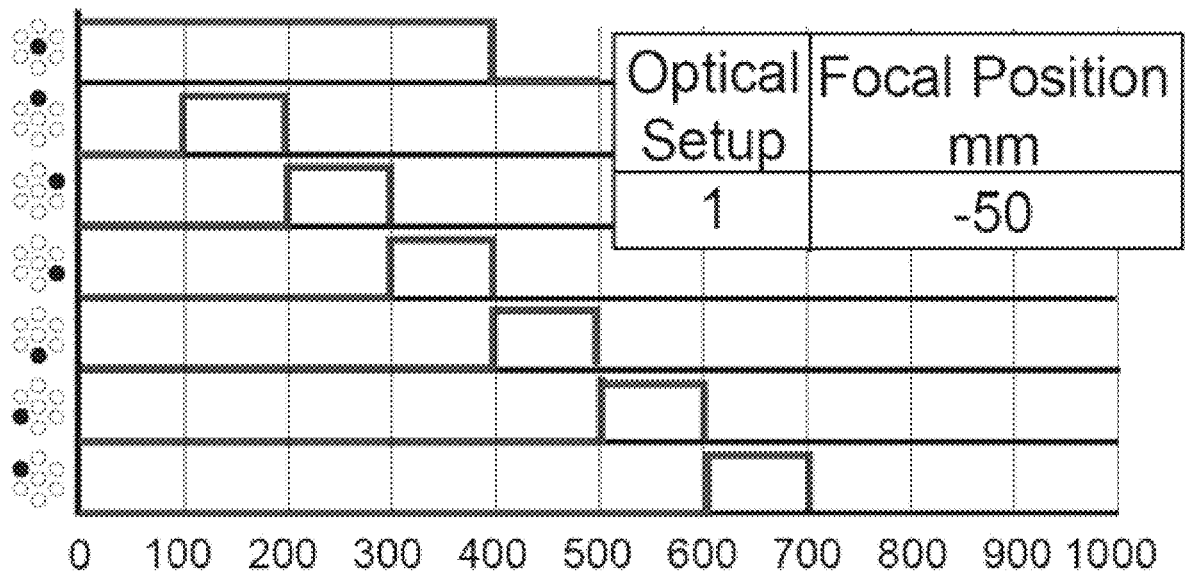
FIG. 7b provides the sequence of the outputs of the preferred embodiment in terms of which fiber as well as the duration of the outputs with respect to each other and the complete cycle for a single spot weld for the spot weld in 7a along with the focal position.
Figure 8A:
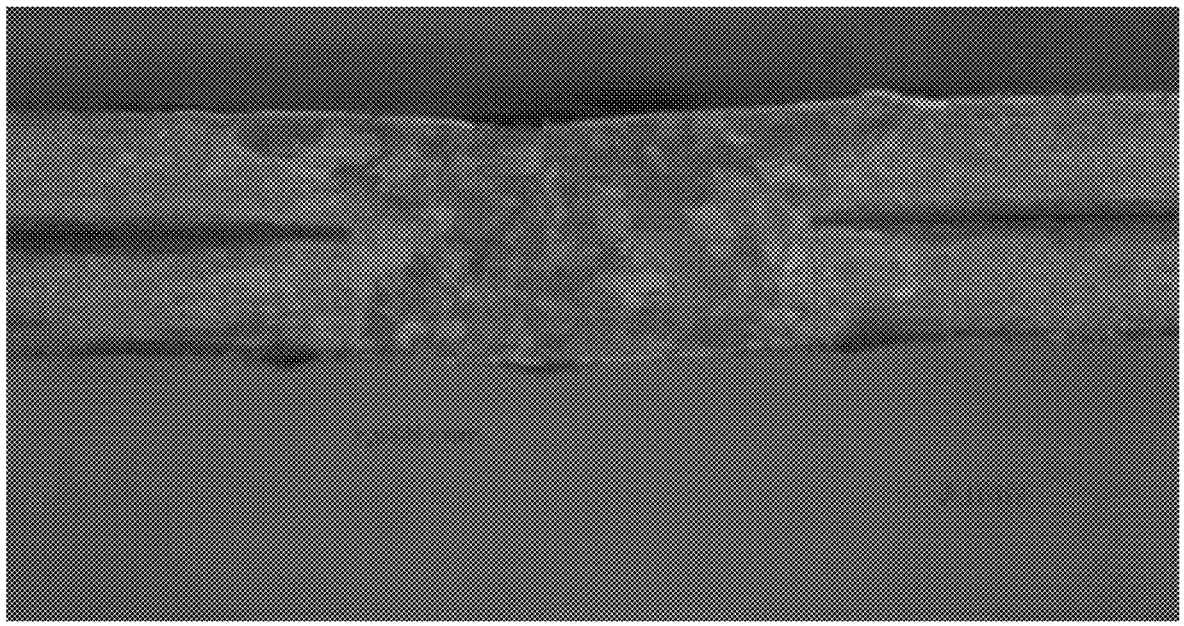
FIG. 8a is a sectional view of a spot weld of the present invention.
Figure 8B:
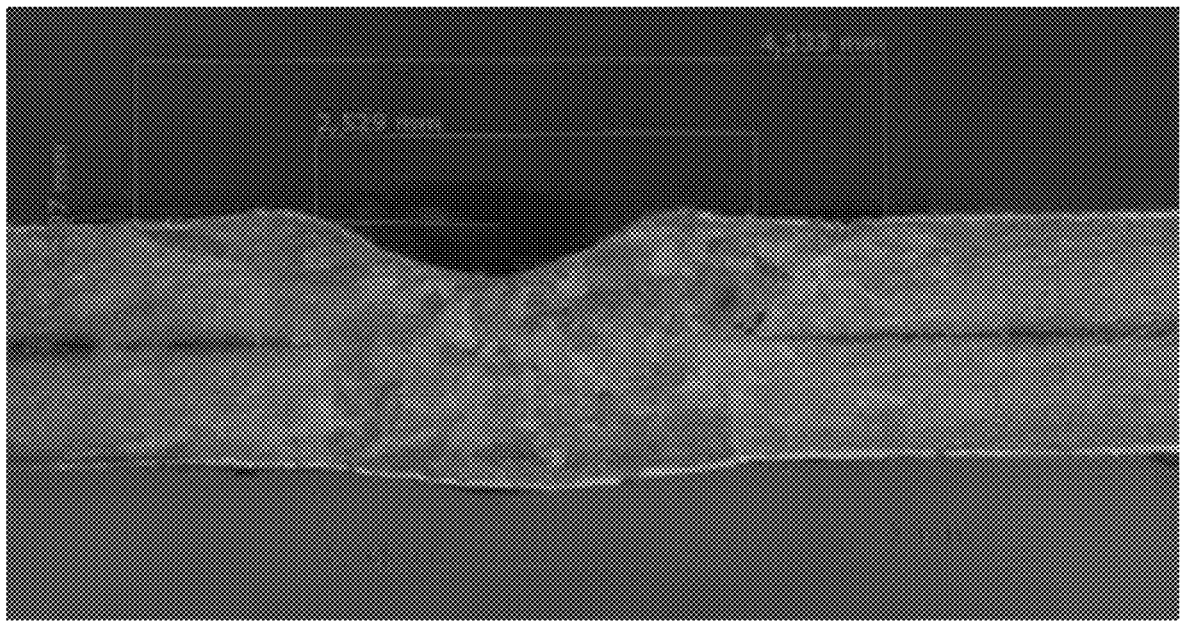
FIG. 8b is a sectional view of another spot weld created by the present invention.
Figure 9A:
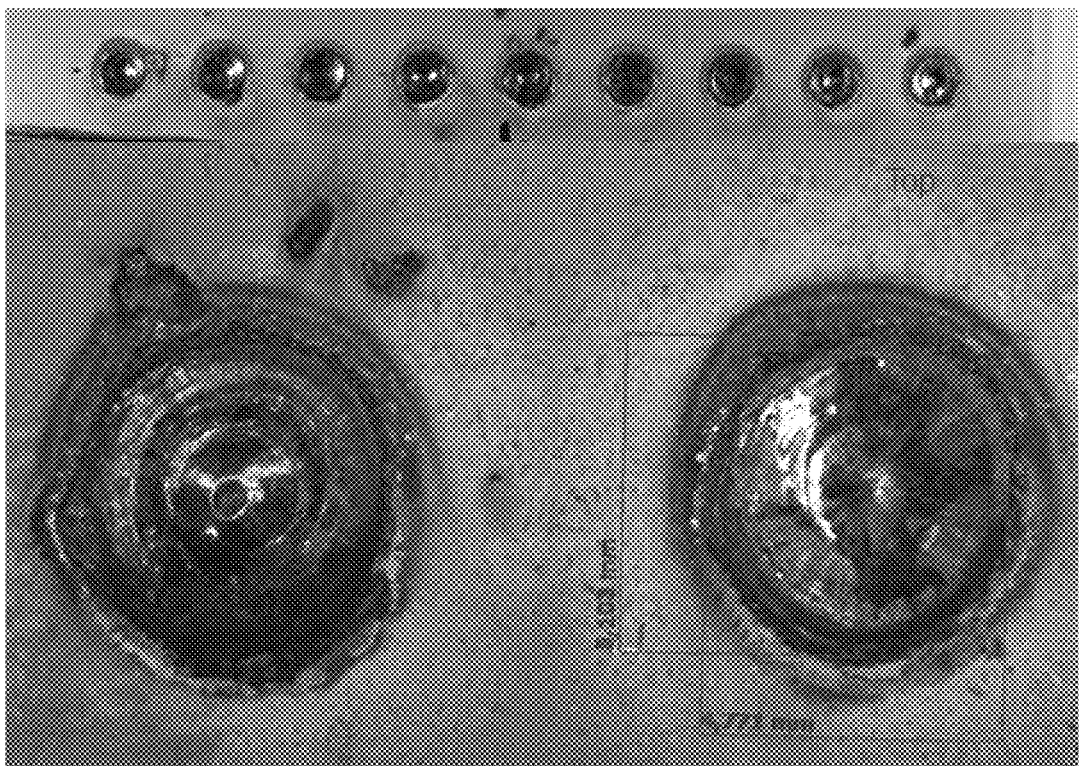
FIG. 9a is top view of two spot welds created by the present invention.
Figure 9B:
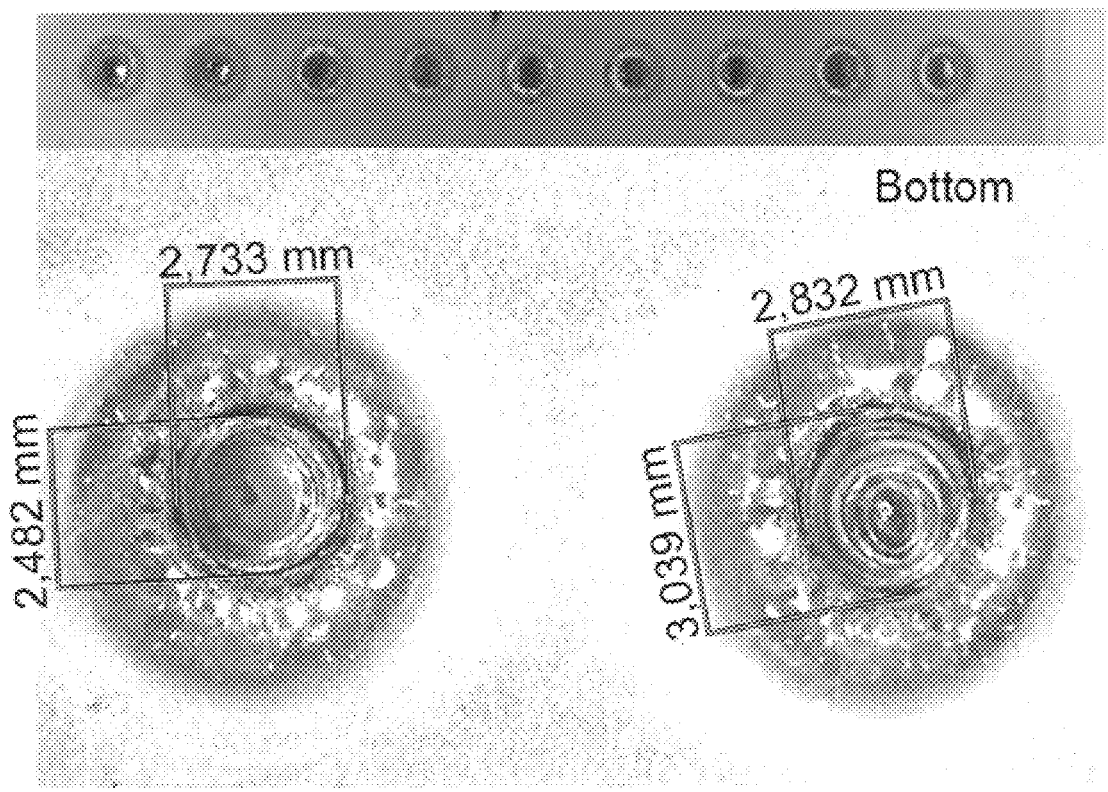
FIG. 9b is a bottom view of two spot welds created by the present invention.

FIGS. 5a and 5b provide intensity distributions of two operating variants for the present invention. 5a concerns the use of focused operation of the present invention while FIG. 5b presents an image of a specifically defocused approach to beam delivery. In both scenarios, the beams are operated sequentially, but by defocusing the output, the spot weld become more homogenous than with the focused version.

As to the optimum equipment in which to integrate the laser of the present invention, it would be preferable to incorporate same into a class 1 laser system that precludes the need for a laser cell. Indeed, the only way the present invention can replace resistance welders on the factory floor is if they have the same if not a better safety record. Accordingly, the laser system of the present invention would be best configured in a class 1 laser system as disclosed in PCT Publication Nos. WO 2014/063153 published 24 Apr. 2014, WO 2014/063151 published 24 Apr. 2014, U.S. Pat. No. 8,766,136 granted July 2014, the contents of all of which are herein incorporated by reference in their entirety.

In addition to the laser system set forth above, the present invention further provides an improved method of creating laser spot welds that allows for the elimination of scanners from the equipment needed to create strong, reliable, and fast welds by the use of multiple fiber outputs that need not be moved once directed to a location by a robot or if pre-positioned.

In a preferred embodiment, the lasers are activated in a sequential fashion. This method has been found to be favorable to creating welds in zinc coated steel, high strength steels as well as aluminum and aluminum alloys as such material have either coatings or oxides that must be vaporized and allowed to vent. Indeed, Applicant's experimentation with simultaneous activation of all fiber laser outputs resulted in substantial spatter that resulted in a weld pool that was smaller than desired.

In addition to the parameters set forth on FIGS. 6a-6c and 7a-7c, Applicant found that use of a cross jet produced superior spot welds. FIGS. 8a-9b are representative of such welds.

Figure 10A:
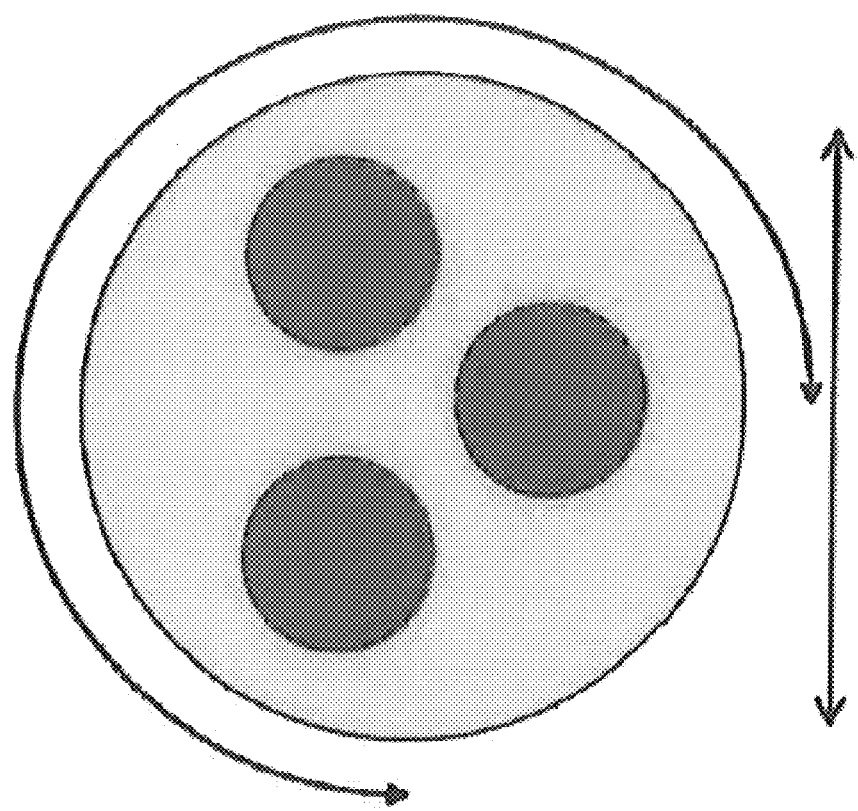
FIG. 10a is a cross-sectional view of an embodiment of the present invention in which a three fiber output is arranged circumferentially.

FIG. 10a provides an embodiment of the present invention whereby three outputs are arranged circumferentially. In this embodiment the fibers are fired sequentially, but that is not a requirement of the present invention. This configuration was found to produce superior welds of electro-galvanized steel, hot-dipped galvanized steel as well as aluminum and various aluminum alloys and hot formed steel such as Usibor® 1500 and 22MnB5 (Usibor® is a trademark of ArcelorMittal).

Figure 10B:
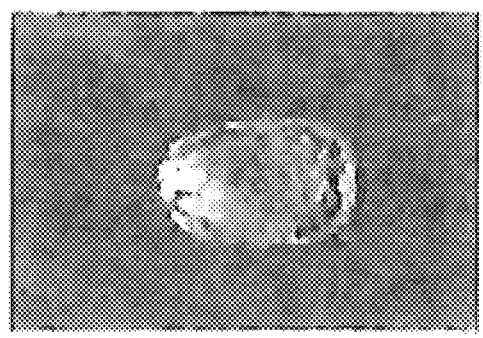

FIG. 10b is a picture of a weld produced by a preferred embodiment arranged in the manner set forth in FIG. 10a.

Those skilled in the art will recognize or be able to ascertain using no more than routine experimentation many equivalents to the specific embodiments of the invention described herein. The disclosed schematics can be used with any light imaging system, but the impetus for the presently disclosed structures and welding methods lie in the disclosed multibeam laser fiber delivery systems.

It should therefore be understood that the foregoing embodiments are presented by way of example only and that within the scope of the appended claims and equivalents thereto, the invention may be practiced otherwise than as specifically described. The present disclosure is directed to each individual feature, system, material and/or method described herein. In addition, any combination of two or more such features, systems, materials and/or methods, if such features, systems, materials and/or methods are not mutually inconsistent, is included within the scope of the present invention.

The invention claimed is:

1. A multi beam output laser system for producing a plurality of laser beam outputs to be delivered to a work piece, the system comprising:
    at least three spaced apart output fibers arranged circumferentially or otherwise at least four spaced apart output fibers optically coupled to distinct laser modules, each separately controllable from the other such that at least three distinct laser outputs can be delivered to said work piece;
    software configured to control the characteristics of the output of each laser and the sequence and timing in which each output is provided to said work piece; and
    a bulk optic, to which each of said output fibers is coupled, configured to receive the distinct laser outputs from the output fibers and output the distinct, spaced apart fiber laser outputs.

2. The system of claim 1, wherein each of said output fibers is fused to the bulk optic.

3. The system of claim 1, wherein at least one of said distinct laser modules is a fiber laser.

4. The system of claim 1, further comprising a processing cable that surrounds the at least four output fibers and the bulk optic.

5. The system of claim 1, wherein a plurality of the at least four fibers are spaced apart such that they represent the points on a polygon.

6. The system of claim 1, wherein one of the at least four fibers is positioned with respect to the others such that the other output fibers are juxtaposed around the one fiber.

7. The system of claim 1 further comprising an optical component downstream of the bulk optic.

8. The system of claim 5, wherein six output fibers form the points of a hexagon.

9. The system of claim 6, wherein six fibers form the points of a hexagon, all of which surround the one fiber.

10. The system of claim 8 or 9 further comprising an additional 12 output fibers that form the points of a dodecagon positioned around the six that form the points of a hexagon.

11. The system of claim 9, wherein the system is configured such that the one fiber is the first of the fibers to provide an output to the work piece.

12. The system of claim 1, wherein the output fibers have distinct internal and/or external diameters.

13. The system of claim 1, wherein the output fibers are single mode.

14. The system of claim 1, wherein the output fibers are multimode.

15. The system of claim 1 further comprising a class 1 laser delivery system.

16. A method of welding a work piece from a multiple fiber laser beam output from a single processing cable, the method comprising:
    providing a laser system including at least three fiber laser modules if delivered in a circumferential arrangement or otherwise at least four fiber laser modules, each configured to operate independently from the others and provide distinct fiber laser outputs;
    initiating a sequence of distinct fiber laser outputs from each of the at least three fiber lasers, each of which is configured to optically couple with the work piece; and
    each distinct fiber laser output configured to deliver an amount of energy sufficient to contribute to a pattern of material interaction, the combination of each laser output on the work piece contributing to a pre determined weld of sufficient strength.

17. The method of claim 16, wherein the sequence of activating each distinct fiber laser output is configured to provide a spot weld.

18. The method of claim 16, wherein the sequence of activating each distinct fiber laser output is configured to provide a seam weld to the work piece.

19. The method of claim 18, wherein the work piece and the sequence of activating each distinct fiber laser output are configured to provide a seam weld that can be characterized as a wobble weld.

20. A multi beam output laser system for producing a plurality of laser beam outputs to be delivered to a work piece, the system comprising:
    at least three spaced apart output fibers arranged circumferentially optically coupled to distinct laser modules, each separately controllable from the other such that at least three distinct laser outputs can be delivered to said work piece;
    software configured to control the characteristics of the output of each laser and the sequence and timing in which each output is provided to said work piece; and
    a bulk optic, to which each of said output fibers is coupled, configured to receive the distinct laser outputs from the output fibers and output the distinct, spaced apart fiber laser outputs.

* * * * *